(12) United States Patent
Wen

(10) Patent No.: US 11,074,212 B2
(45) Date of Patent: Jul. 27, 2021

(54) ELECTRONIC DEVICE HAVING TYPE C USB INTERFACE, METHOD FOR CONTROLLING TYPE C USB INTERFACE, AND STORAGE MEDIUM

(71) Applicant: HUAWEI TECHNOLOGIES CO., LTD., Shenzhen (CN)

(72) Inventor: Chong Wen, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/650,340

(22) PCT Filed: Sep. 30, 2017

(86) PCT No.: PCT/CN2017/105135
§ 371 (c)(1),
(2) Date: Mar. 24, 2020

(87) PCT Pub. No.: WO2019/061538
PCT Pub. Date: Apr. 4, 2019

(65) Prior Publication Data
US 2020/0311010 A1 Oct. 1, 2020

(51) Int. Cl.
*G06F 13/42* (2006.01)
*G06F 13/40* (2006.01)
*H05K 9/00* (2006.01)

(52) U.S. Cl.
CPC .. *G06F 13/4282* (2013.01); *G06F 2213/0042* (2013.01)

(58) Field of Classification Search
CPC .............................................. G06F 2213/0042
See application file for complete search history.

(56) References Cited

U.S. PATENT DOCUMENTS 9,146,888 B2 9/2015 Terlizzi et al.
9,400,546 B1 * 7/2016 Agarwal ............... G06F 1/3296
(Continued)

FOREIGN PATENT DOCUMENTS

CN 104218350 A 12/2014
CN 104268110 A 1/2015
(Continued)

OTHER PUBLICATIONS

Ruan Yi et al,"Introduction and Application of USB Type-C and PD Technology", Research and Design, Apr. 2017, total 7 pages. With an English Abstract.

*Primary Examiner* — Idriss N Alrobaye
*Assistant Examiner* — Ronald T Modo
(74) *Attorney, Agent, or Firm* — Stein IP, LLC

(57) ABSTRACT

A method for controlling a Type C USB interface includes disconnecting a shielding housing of a Type C USB interface (J1) from the ground of an electronic device, obtaining a level (V12) of the shielding housing, determining, based on the obtained level (V12), whether an external device is plugged into or unplugged from the Type C USB interface (J1); outputting a signal to a CC pin of the Type C USB interface (J1) when it is determined that the external device is plugged into the Type C USB interface (J1) of the electronic device; and stopping outputting the signal to the CC pin of the Type C USB interface (J1) when it is determined that the an external device is unplugged from the Type C USB interface (J1) of the electronic device or that no the external device is connected to the Type C USB interface (J1).

20 Claims, 8 Drawing Sheets

(56) References Cited

U.S. PATENT DOCUMENTS

| | | |
|---|---|---|
| 9,625,988 B1 | 4/2017 | Agarwal et al. |
| 2014/0218045 A1 | 8/2014 | Shoykhet et al. |
| 2016/0342492 A1 | 11/2016 | Chen et al. |
| 2017/0110835 A1 | 4/2017 | Hasegawa et al. |
| 2017/0194803 A1 | 7/2017 | Card et al. |
| 2017/0262035 A1 | 9/2017 | Agarwal et al. |

FOREIGN PATENT DOCUMENTS

| | | |
|---|---|---|
| CN | 105630724 A | 6/2016 |
| CN | 105656162 A | 6/2016 |
| CN | 105955912 A | 9/2016 |
| CN | 106020176 A | 10/2016 |
| CN | 106095715 A | 11/2016 |
| CN | 106291210 A | 1/2017 |
| CN | 106598818 A | 4/2017 |
| CN | 106802875 A | 6/2017 |
| CN | 106844265 A | 6/2017 |
| CN | 107077183 A | 8/2017 |

* cited by examiner

ELECTRONIC DEVICE HAVING TYPE C USB INTERFACE, METHOD FOR CONTROLLING TYPE C USB INTERFACE, AND STORAGE MEDIUM

CROSS-REFERENCE TO RELATED APPLICATIONS

This application is a National Stage of International Application No. PCT/CN2017/105135, filed on Sep. 30, 2017, which is hereby incorporated by reference in its entirety.

TECHNICAL FIELD

Aspects of this application relate to the field of communications technologies, and in particular, to an electronic device having a Type C USB interface, a method for controlling a Type C USB interface, and a storage medium.

BACKGROUND

With continuous development of science and technologies, terminals (such as smartphones) become an irreplaceable part of life. The terminal usually has a plurality of interfaces, such as a universal serial bus (USB) interface and a headset jack. Data transmission, terminal charging, and the like are implemented by using the foregoing interfaces.

The USB interface of the terminal is usually a micro USB interface or a type-C universal interface. In a solution in the prior art, a pulse signal is output to a CC pin of a Type C USB interface, to identify a type of an external device plugged into the Type C USB interface.

However, in the foregoing solution, when the terminal device is in a power-on state, the terminal may continuously output the pulse signal to the CC pin of the Type C USB interface, causing continuous charging of the CC pin of the Type C USB interface. Therefore, this not only wastes power of the terminal, but also brings security risks (such as short circuit and corrosion caused by liquid in the interface) to the terminal.

SUMMARY

Embodiments of this application provide an electronic device having a Type C USB interface, a method for controlling a Type C USB interface, and a storage medium, to resolve problems of security risks and terminal power waste caused by continuous charging of an interface of a terminal.

According to a first aspect, an embodiment of this application provides an electronic device. The electronic device includes a Type C USB interface, where the Type C USB interface has a shielding housing. The electronic device further includes a processor, where the processor is connected to the Type C USB interface; the Type C USB interface is configured to connect to an external device; the shielding housing of the Type C USB interface is disconnected from a ground signal of the electronic device; when no external device is connected to the Type C USB interface, a voltage level of the shielding housing of the Type C USB interface is a first voltage level, where the first voltage level is greater than 0; when the external device is connected to the Type C USB interface, the processor outputs a signal to a CC pin of the Type C USB interface; and when no external device is connected to the Type C USB interface, the processor stops outputting the signal to the CC pin of the Type C USB interface.

In this embodiment of this application, when it is determined that the external device is plugged into the Type C USB interface of the electronic device, the signal is output to the CC pin of the Type C USB interface; and when it is determined that the external device is unplugged from the Type C USB interface of the electronic device, that no external device is connected to the Type C USB interface of the electronic device, or that there is liquid or stains in the Type C USB interface of the electronic device, outputting of the signal to the CC pin of the Type C USB interface is stopped. Therefore, problems of power losses and security risks (such as short circuit and corrosion caused by the liquid in the interface) caused by continuous charging of the CC pin of the Type C USB interface are effectively alleviated.

In a possible design, the electronic device further includes a PD module, where the processor is connected to the Type C USB interface by using the PD module. The processor is specifically configured to: when the external device is connected to the Type C USB interface, control the PD module to output the signal to the CC pin of the Type C USB interface; and when no external device is connected to the Type C USB interface, control the PD module to stop outputting the signal to the CC pin of the Type C USB interface.

In a possible design, the processor is further configured to: output first prompt information when the external device is unplugged from the Type C USB interface, where the first prompt information is used to inform that the external device is unplugged from the Type C USB interface; and/or output second prompt information when the external device is connected to the Type C USB interface, where the second prompt information is used to inform that the external device is connected to the Type C USB interface. In this embodiment of the present invention, the prompt information is used to inform a user that the external device is plugged or unplugged, improving user experience.

In a possible design, the processor is further configured to stop outputting the signal to the CC pin of the Type C USB interface when there is liquid or stains in the Type C USB interface. In this embodiment of this application, outputting of the signal to the CC pin of the Type C USB interface is stopped when there is liquid or stains in the Type C USB interface, so that problems of power losses and security risks (such as short circuit and corrosion caused by liquid in the interface) caused by continuous charging of the CC pin of the Type C USB interface are effectively alleviated.

In a possible design, the processor is further configured to output third prompt information, and the third prompt information is used to inform that there is liquid or stains in the Type C USB interface.

In a possible design, the electronic device further includes a first comparator, where a first positive input end of the first comparator is connected to the shielding housing of the Type C USB interface; a first negative input end of the first comparator is connected to a first reference voltage; a first output end of the first comparator is connected to the processor; the first comparator is configured to compare a voltage level of the first positive input end with a voltage level of the first negative input end and output a first comparison signal to the processor; and the processor is configured to determine, based on the first comparison signal, that the external device is unplugged from the Type C USB interface and/or that the external device is connected to the Type C USB interface.

In a possible design, the electronic device further includes a second comparator, where a second negative input end of the second comparator is connected to the shielding housing of the Type C USB interface; a second positive input end of the second comparator is connected to a second reference voltage; a second output end of the second comparator is connected to the processor; the first comparator is configured to compare a voltage level of the second positive input end with a voltage level of the second negative input end and output a second comparison signal to the processor; and the processor is configured to determine, based on the first comparison signal and the second comparison signal, that the external device is unplugged from the Type C USB interface, and/or that the external device is connected to the Type C USB interface, and/or that there is liquid or stains in the Type C USB interface.

In a possible design, the processor includes an analog-to-digital converter (ADC) detection module, and the ADC detection module is connected to the shielding housing of the Type C USB interface; the ADC detection module is configured to detect the voltage level of the shielding housing of the Type C USB interface; and the processor is configured to determine, based on the voltage level detected by the ADC detection module, that the external device is unplugged from the Type C USB interface, and/or that the external device is connected to the Type C USB interface, and/or there is liquid in the Type C USB interface.

According to a second aspect, an embodiment of this application provides a method for controlling a Type C USB interface, applied to the electronic device provided in the first aspect of the embodiments of this application. The method includes: obtaining a voltage level of a shielding housing of the Type C USB interface; and stopping outputting a signal to a CC pin of the Type C USB interface when no external device is connected to the Type C USB interface.

In a possible design, the signal is output to the CC pin of the Type C USB interface when the external device is plugged into the Type C USB interface.

In a possible design, first prompt information is output when the external device is unplugged from the Type C USB interface, where the first prompt information is used to inform that the external device is unplugged from the Type C USB interface; and second prompt information is output when the external device is connected to the Type C USB interface, where the second prompt information is used to inform that the external device is connected to the Type C USB interface.

In a possible design, outputting of the signal to the CC pin of the Type C USB interface is stopped when there is liquid or stains in the Type C USB interface.

In a possible design, third prompt information is output, and the third prompt information is used to inform that there is liquid or stains in the Type C USB interface.

In a possible design, that the external device is unplugged from the Type C USB interface, and/or that the external device is connected to the Type C USB interface, and/or that there is liquid or stains in the Type C USB interface are/is determined based on the voltage level of the shielding housing of the Type C USB interface.

According to a third aspect, an embodiment of this application provides an electronic device, including a display, a memory, one or more processors, a plurality of application programs, and one or more programs. The one or more programs are stored in the memory, and when the one or more processors execute the one or more programs, the electronic device is enabled to implement the method according to the second aspect or the possible designs of the second aspect. Based on a same inventive concept, the processor invokes the program stored in the memory, to implement the solutions in the method designs according to the second aspect. For problem-resolving implementations and beneficial effects of the electronic device, refer to the implementations and the beneficial effects of the method according to the second aspect or the possible designs of the second aspect. Therefore, for implementations of the electronic device, refer to the implementations of the method. Repeated descriptions are not provided again.

According to a fourth aspect, an embodiment of this application provides an electronic device, including an obtaining module, a determining module, and a control module. The obtaining module is configured to obtain a voltage level of a shielding housing of a Type C USB interface of the electronic device. The determining module is configured to determine, based on the obtained voltage level, that no external device is connected to the Type C USB interface. The control module is configured to stop outputting a signal to a CC pin of the Type C USB interface when it is determined that no external device is connected to the Type C USB interface. Based on a same inventive concept, for problem-resolving principles and beneficial effects of the electronic device, refer to the implementations of the method according to the first aspect or the possible designs of the first aspect or the second aspect or the possible designs of the second aspect and the brought beneficial effects. Therefore, for implementations of the electronic device, refer to the implementations of the method according to the first aspect or the possible designs of the first aspect or the second aspect or the possible designs of the second aspect. Repeated descriptions are not provided again.

According to a fifth aspect, an embodiment of this application further provides a computer-readable storage medium, including an instruction, where when the instruction is run on an electronic device, the electronic device is enabled to implement the implementations of the method according to the second aspect or the possible designs of the second aspect. Repeated descriptions are not provided again.

In the embodiments of this application, the voltage level of the shielding housing of the Type C USB interface of the electronic device is obtained; whether the external device is plugged into or unplugged from the Type C USB interface and whether there is liquid or stains in the Type C USB interface are determined based on the obtained voltage level; when it is determined that the external device is plugged into the Type C USB interface of the electronic device, the CC signal of the Type C USB interface is enabled; and when it is determined that the external device is unplugged from the Type C USB interface of the electronic device or that there is liquid or stains in the Type C USB interface of the electronic device, the CC signal of the Type C USB interface is disabled. Therefore, problems of terminal power waste and security risks (such as short circuit and corrosion caused by liquid in the interface) caused by real-time charging of the CC pin of the Type C USB interface are effectively alleviated.

DESCRIPTION OF EMBODIMENTS

To make the purpose, technical solutions, and advantages of the embodiments of this application clearer, the following clearly and completely describes the technical solutions of the embodiments of this application with reference to the accompanying drawings in the embodiments of this application.

Embodiments of this application provide an electronic device. The electronic device may be, but is not limited to: a smartphone, a tablet computer, a vehicle-mounted device, an air conditioner, a refrigerator, or the like, and the device has an interface. The interface may be, but is not limited to: a Type C universal serial bus (Universal Serial Bus, USB) interface, a Type C headset jack, or the like. For ease of description, in the embodiments of this application, the Type C USB interface is used as an example for schematic description.

The Type C USB interface of the electronic device provided in the embodiments of this application has a shielding housing. The shielding housing of the Type C USB interface is disconnected from the ground of the electronic device, and a voltage V0 of a first voltage level is applied to the shielding housing of the Type C USB interface.

Figure 1:
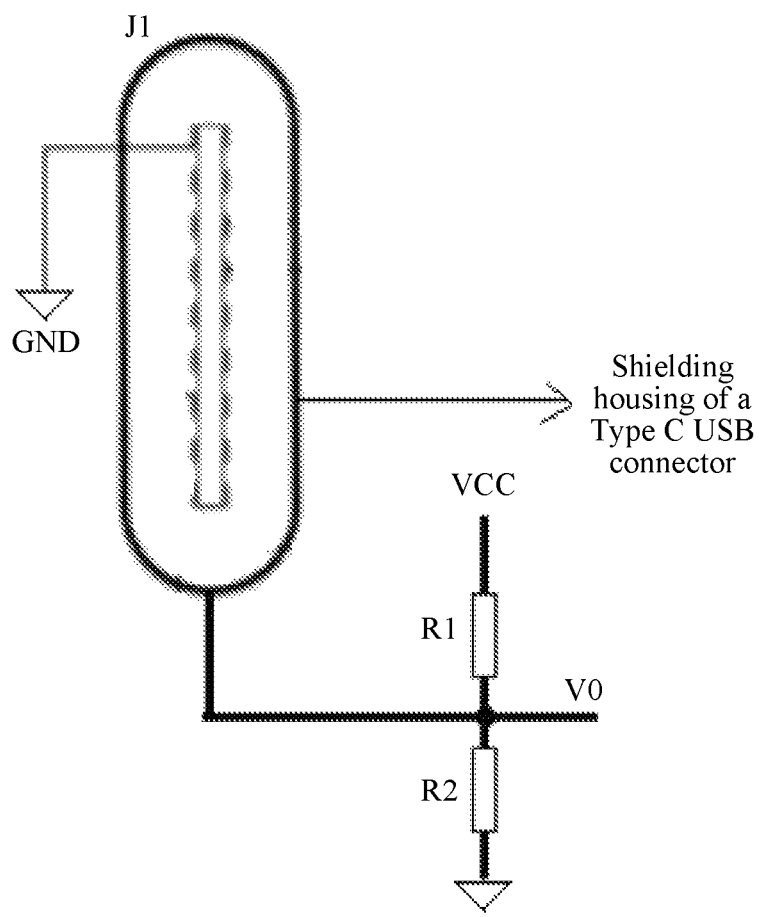
FIG. 1 is a circuit diagram of a first Type C USB interface according to an embodiment of this application.

FIG. 1 is a circuit diagram of a first Type C USB interface according to an embodiment of this application.

FIG. 1 shows a Type C USB interface J1 of an electronic device. A shielding housing of J1 is disconnected from the ground (Ground, GND) and is connected to R2 and R1, and R2 and R1 divide a voltage Vcc, so that a bias voltage V0 can be applied to the shielding housing of the Type C USB interface, that is: $V0=R2 \times Vcc/(R1+R2)$.

When no external device is connected to the electronic device by using J1, a voltage level of the shielding housing of J1 is V0.

When the external device is connected to the electronic device by using J1, the voltage level of the shielding housing of J1 of the electronic device is a low voltage level because a shielding housing of a Type C USB interface of the external device is connected to the ground of the electronic device and is connected to the shielding housing of J1 of the electronic device.

Figure 2:
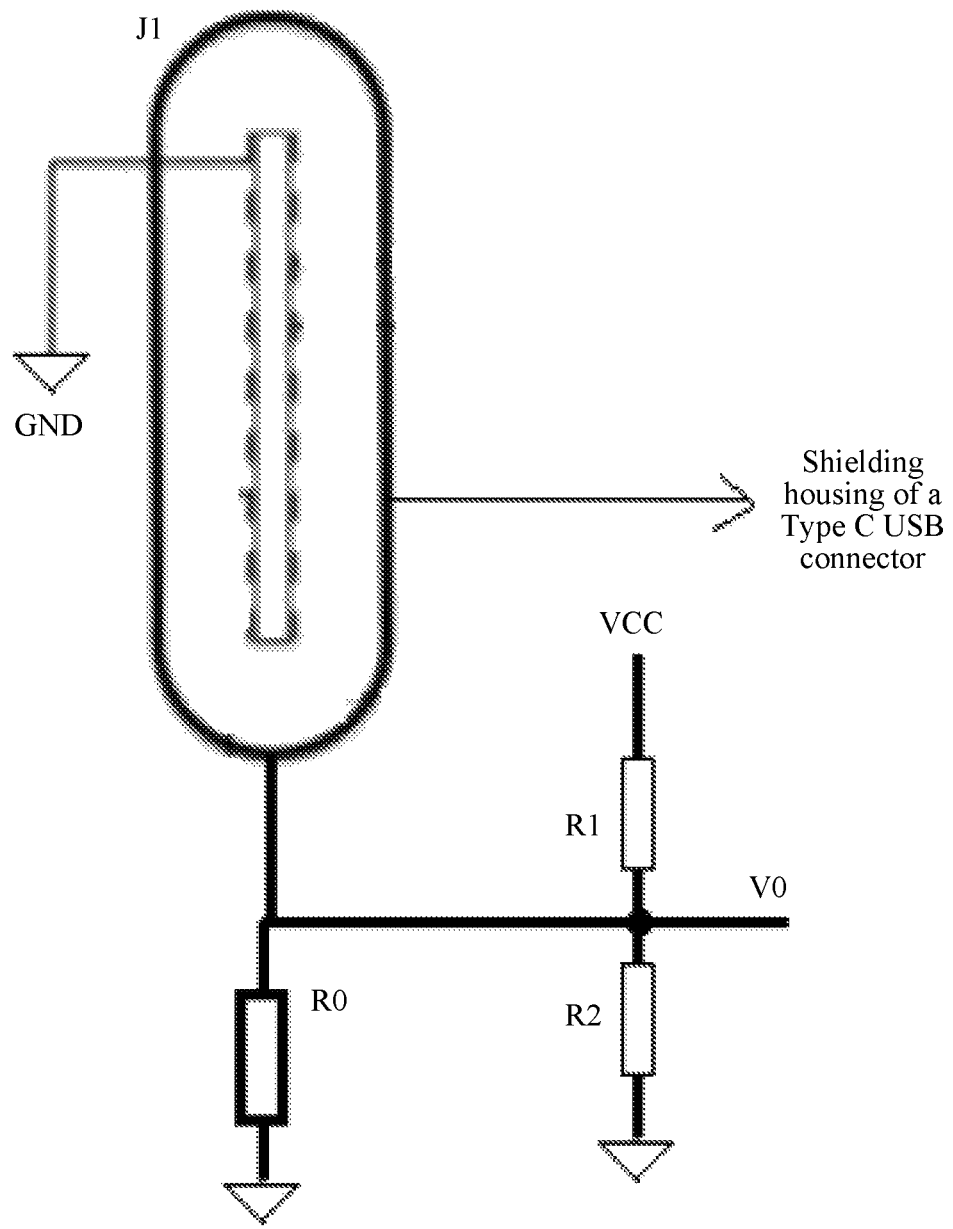
FIG. 2 is an equivalent circuit diagram in which there is liquid or stains in a Type C USB interface according to an embodiment of this application.

FIG. 2 is an equivalent circuit diagram in which there is liquid or stains in a Type C USB interface according to an embodiment of this application.

As shown in FIG. 2, when there is liquid or stains (any sundries/anything dirty) in a Type C USB interface J1 of an electronic device, it is equivalent to adding, between a shielding housing of the Type C USB interface J1 of the electronic device and the ground, impedance R0 that is connected in parallel to R2. In other words, the impedance between the shielding housing of the Type C USB interface of the electronic device and the ground is reduced from R2 to the impedance R0 that is connected in parallel to R2, that is, the impedance between the shielding housing of the Type C USB interface of the electronic device and the ground is reduced. Therefore, a voltage level of the shielding housing of the Type C USB interface of the electronic device is reduced.

Based on the above, whether an external device is plugged into the Type C USB interface of the electronic device, whether the external device is unplugged from the Type C USB interface of the electronic device, and whether there is liquid or stains in the Type C USB interface of the electronic device may be determined by obtaining the voltage level of the shielding housing of the Type C USB interface J1 of the electronic device.

Further, when it is obtained that no external device is connected to the Type C USB interface of the electronic device or that the external device is unplugged from the Type C USB interface of the electronic device, a pulse signal of a CC pin of the Type C USB interface is disabled; or when it is obtained that the external device is connected to the Type C USB interface of the electronic device, a pulse signal of a CC pin of the Type C USB interface is enabled, to obtain a type of the external device. Therefore, problems of terminal power waste and security risks (such as short circuit and corrosion caused by liquid in the interface) caused by real-time charging of the CC pin of the Type C USB interface are effectively alleviated.

Figure 3:
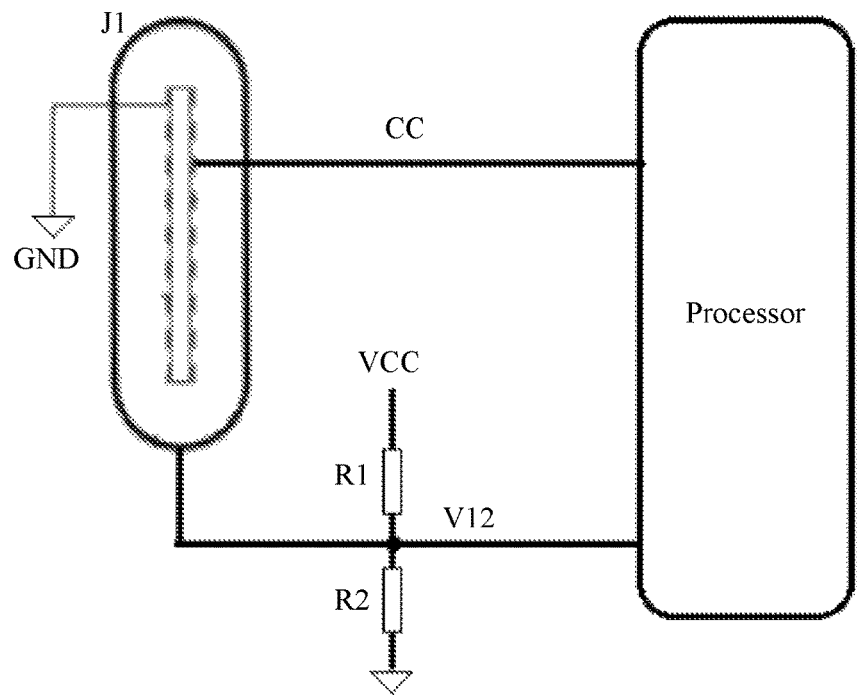
FIG. 3 is a circuit diagram of a second Type C USB interface according to an embodiment of this application.

FIG. 3 is a circuit diagram of a second Type C USB interface according to an embodiment of this application.

In an optional implementation, as shown in FIG. 3, a processor identifies a voltage level V12 of a shielding housing of J1, and controls a signal of a CC pin of a Type C USB interface of an electronic device.

When the processor identifies that a voltage level value of V12 is less than a first preset threshold, it is determined that an external device is plugged into the Type C USB interface J1 of the electronic device. When it is determined that the external device is plugged into the Type C USB interface J1 of the electronic device, the processor controls to output the signal to the CC pin of J1, to obtain a type of the plugged external device. Optionally, when it is determined that the external device is plugged into the Type C USB interface J1 of the electronic device, text, figures, or audio may be output to inform a user.

When the processor identifies that the voltage level value of V12 is greater than a second preset threshold and less than a third preset threshold, for example, the voltage level V12 is V0, it is determined that no external device is plugged into the Type C USB interface J1 of the electronic device or that the external device is unplugged from the Type C USB interface J1 of the electronic device. When it is determined that no external device is plugged into the Type C USB interface J1 of the electronic device or that the external device is unplugged from the Type C USB interface J1 of the electronic device, the processor stops outputting the signal to the CC pin of J1. Optionally, when it is determined that the external device is unplugged from the Type C USB interface J1 of the electronic device, text, figures, or audio may be output to inform a user.

When the processor identifies that the voltage level value of V12 is greater than a first preset threshold and less than a second preset threshold, it is determined that there is liquid or stains in J1. Because a difference between conductivity capabilities of different liquid or impurities indicates different resistance values of R0, different liquid or impurities correspond to different impedance R0. Therefore, the shielding housing of J1 has different voltage levels. Further, N threshold ranges corresponding to types of the liquid or the stains may be set between the first preset threshold and the second preset threshold. The type of the liquid or the stains is determined based on a preset threshold range in which the obtained voltage level falls. Optionally, when it is determined that there is liquid or stains in the Type C USB interface J1 of the electronic device, text, figures, or audio may be output to inform a user.

Figure 4:
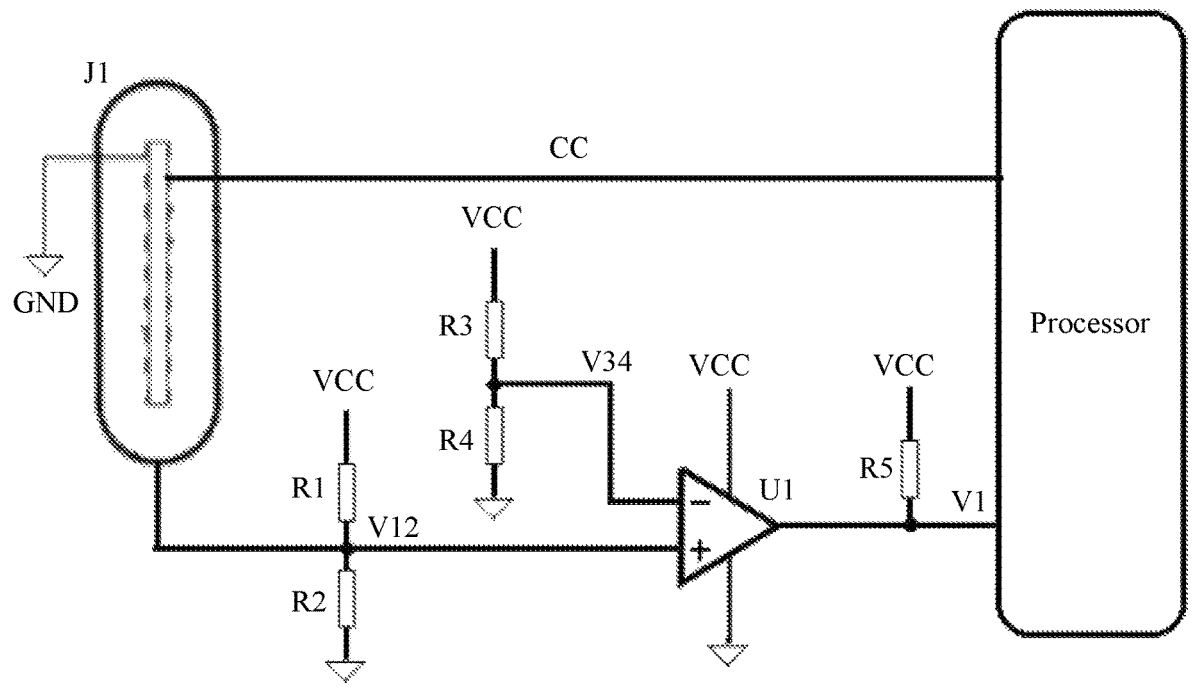
FIG. 4 is a circuit diagram of a third Type C USB interface according to an embodiment of this application.

FIG. 4 is a circuit diagram of a third Type C USB interface according to an embodiment of this application.

Optionally, FIG. 4 shows an implementation in which a processor determines whether an external device is plugged into J1.

An electronic device includes a comparator U1, divided voltages R1, R2, R3, and R4, a voltage Vcc, a processor, and an interface J1. A shielding housing of J1 is disconnected from the ground of the electronic device and is connected to bleeder resistance R1 and R2. A voltage level of the shielding housing of J1 is a voltage level Vcc×R2/(R1+R2), where the voltage level is divided by R2 and R1.

A negative input end of the comparator U1 is connected to the divided voltages R3 and R4, and the voltage Vcc is divided by R3 and R4. Therefore, a voltage value V34 of the negative input end of the comparator U1 is a voltage value Vcc×R4/(R3+R4), where the voltage value is obtained through division on R4. A positive input end of the comparator U1 is connected to the shielding housing of the interface of a terminal. When a voltage value V12 of the shielding housing of J1 is greater than V34, the comparator U1 outputs a high voltage level, indicating that the external device is unplugged from the interface J1 or that no external device is plugged into J1; or when V12 is less than V34, the comparator U1 outputs a low voltage level, indicating that the external device is plugged into the interface J1. The processor may determine, based on the high/low voltage level output by the comparator U1, whether the external device is plugged into J1.

Figure 5:
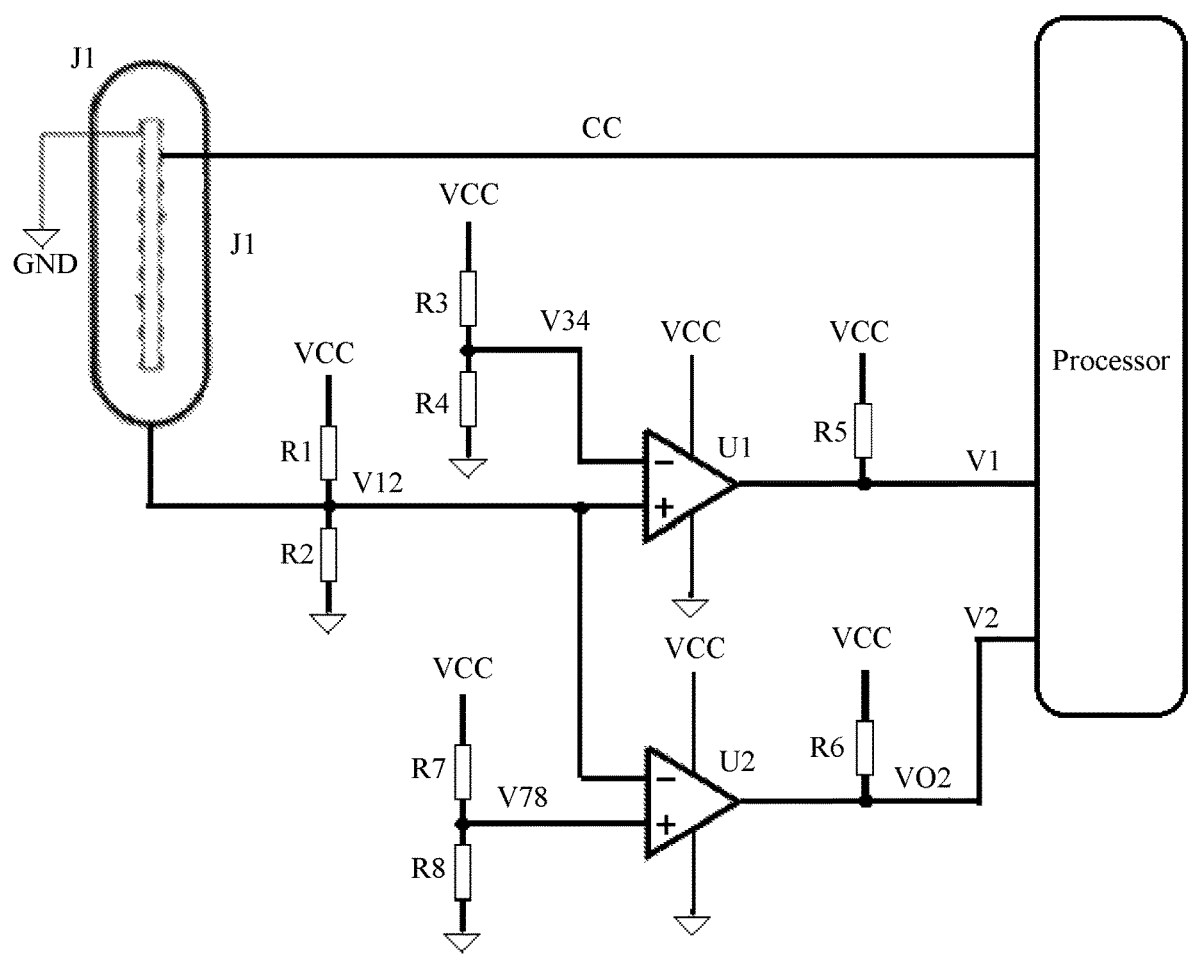
FIG. 5 is a circuit diagram of a fourth Type C USB interface according to an embodiment of this application.

FIG. 5 is a circuit diagram of a fourth Type C USB interface according to an embodiment of this application.

Optionally, FIG. 5 shows another implementation in which a processor determines whether an external device is plugged into J1.

An electronic device includes comparators U1 and U2, divided voltages R1, R2, R3, R4, R7 and R8, a voltage Vcc, a processor, and an interface J1. A shielding housing of J1 is disconnected from the ground of the electronic device and is connected to bleeder resistance R1 and R2. A voltage level of the shielding housing of J1 is a voltage level Vcc×R2/(R1+R2), where the voltage level is divided by R2 and R1.

Whether the external device is plugged into or unplugged from the interface J1 and whether there is liquid or stains in the interface J1 may be determined by using the comparators U1 and U2.

As shown in FIG. 5, a negative input end of the comparator U1 is connected to the divided voltages R3 and R4, and the voltage Vcc is divided by R3 and R4. Therefore, a voltage value V34 of the negative input end of the comparator U1 is a voltage value Vcc×R4/(R3+R4), where the voltage value is obtained through division on R4. A positive input end of the comparator U1 is connected to the shielding housing of the interface J1. A negative input end of the comparator U2 is connected to the shielding housing of the interface J1. A positive input end of the comparator U2 is connected to the divided voltages R7 and R8, and the voltage Vcc is divided by R7 and R8. Therefore, a voltage value V78 of the positive input end of the comparator U2 is a voltage value Vcc×R8/(R7+R8), where the voltage value is obtained through division on R8. Appropriate R1, R2, R3, R4, R7 and R8 are selected, so that the voltage of the shielding housing of J1 satisfies: V12>V34 and V12>V78 when no external device is plugged into J1. That is, V1 output by the comparator U1 to the processor is a high voltage level, and V2 output by the comparator U2 to the processor is a low voltage level. The processor may determine, based on the voltage level states of V1 and V2, that no external device is plugged into J1 or that the external device is unplugged from J1 in this case.

When the external device is plugged into J1, the voltage of the shielding housing of the J1 satisfies: V12<V78 and V12<V34. That is, V1 output by the comparator U1 to the processor is a low voltage level, and V2 output by the comparator U2 to the processor is a high voltage level. The processor may determine, based on the voltage level states of V1 and V2, that the external device is plugged into J1 in this case.

When there is liquid or stains in the shielding housing of J1, the voltage of the shielding housing of J1 satisfies: V34<V12<V78. That is, V1 output by the comparator U1 to the processor is a high voltage level, and V2 output by the comparator U2 to the processor is a high voltage level. The processor may determine, based on the voltage level states of V1 and V2, that the external device is plugged into J1 in this case.

Figure 6:
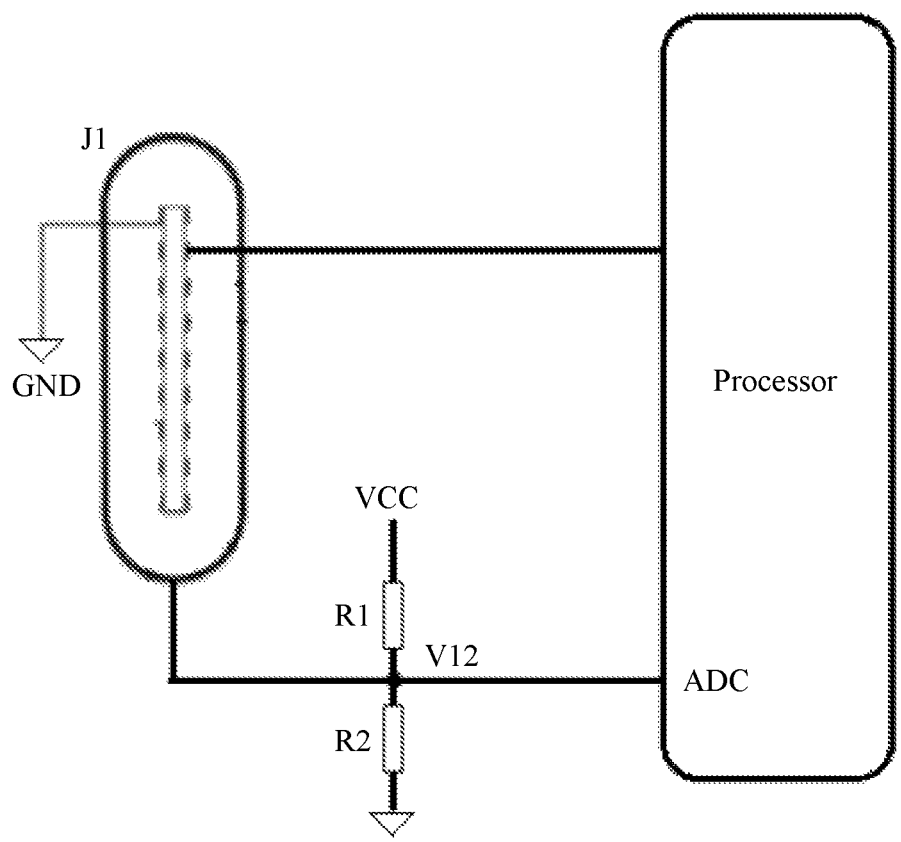
FIG. 6 is a circuit diagram of a fifth Type C USB interface according to an embodiment of this application.

FIG. 6 is a circuit diagram of a fifth Type C USB interface according to an embodiment of this application.

Optionally, FIG. 6 shows still another implementation in which a processor determines whether an external device is plugged into J1.

An electronic device includes divided voltages R1 and R2, a voltage Vcc, a processor, and an interface J1. A shielding housing of J1 is disconnected from the ground of the electronic device and is connected to bleeder resistance R1 and R2. When no external device is plugged into the interface J1, a voltage level V12 of the shielding housing of J1 is a voltage level Vcc×R2/(R1+R2), where the voltage level is divided by R2 and R1. When the external device is plugged into the interface J1, the voltage level V12 of the shielding housing of J1 approaches 0, and when there is liquid or stains in the shielding housing of the J1, V12 is between 0 and Vcc×R2/(R1+R2). The processor may determine, by identifying the voltage level of the shielding housing of J1 and comparing the voltage level with a preset threshold, whether the external device is plugged into or unplugged from the interface J1 and whether there is liquid or stains in J1.

Figure 7:
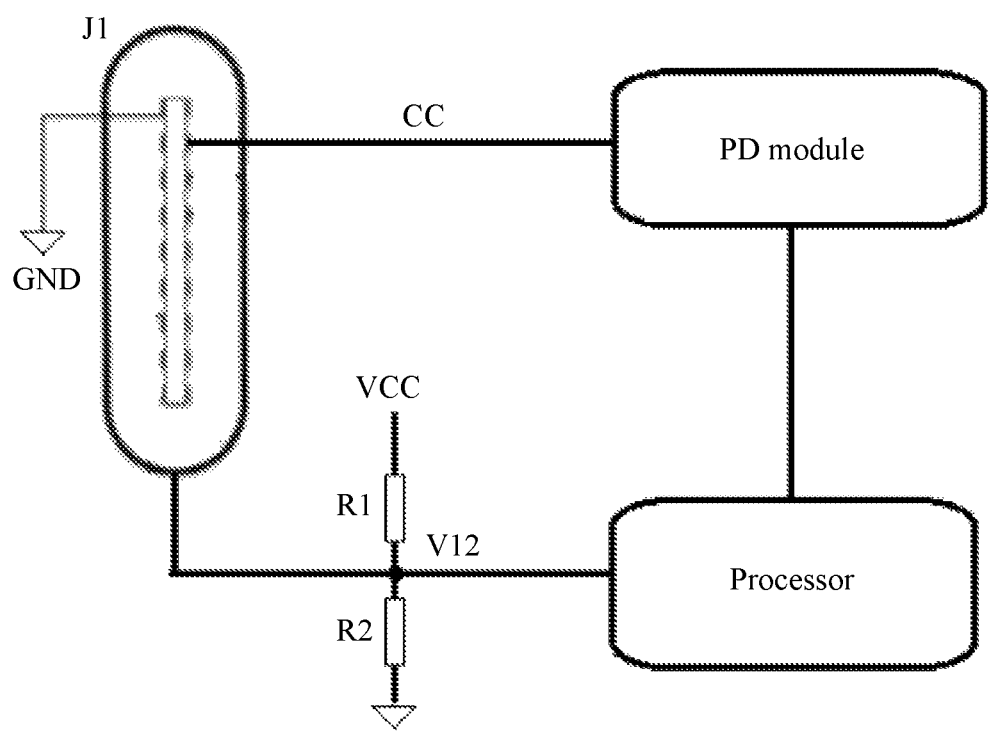
FIG. 7 is a circuit diagram of a sixth Type C USB interface according to an embodiment of this application.

FIG. 7 is a circuit diagram of a sixth Type C USB interface according to an embodiment of this application.

Optionally, in this embodiment of this application, a processor may be directly connected to a CC pin of an interface J1, so that the processor stops outputting a pulse signal to the CC pin of a Type C USB interface when determining that no external device is connected to the Type C USB interface of an electronic device or that the external device is unplugged from the Type C USB interface of the electronic device.

Optionally, as shown in FIG. 7, in this embodiment of this application, a processor may be connected to a CC pin of an interface J1 by using a power delivery (PD) module. The processor controls, when determining that no external device is connected to the Type C USB interface of an electronic device or that the external device is unplugged from the Type C USB interface of the electronic device, the PD module to stop outputting a pulse signal to the CC pin of a Type C USB interface.

Optionally, in this embodiment of this application, a processor may be directly connected to a CC pin of an interface J1, so that the processor outputs a pulse signal to the CC pin of the Type C USB interface when determining that an external device is plugged into the interface J1.

Optionally, as shown in FIG. 7, in this embodiment of this application, the processor may be connected to the CC pin of the interface J1 by using the PD module. The processor controls, when determining that an external device is plugged into the interface J1, the PD module to output a pulse signal to the CC pin of the Type C USB interface.

In the embodiments of this application, the processor may be directly connected to the Type C USB interface, as shown in FIG. 3 to FIG. 6, or may be connected to the Type C USB interface by using the PD module, as shown in FIG. 7. The manner in FIG. 7 in which the processor is connected to the Type C USB interface is applicable to all implementations in the embodiments of this application. For example, the manner in FIG. 3 to FIG. 5 in which the processor is directly connected to the Type C USB interface is changed to the manner in which the processor is connected to the Type C USB interface by using the PD module. Details are not described herein again.

Figure 8:
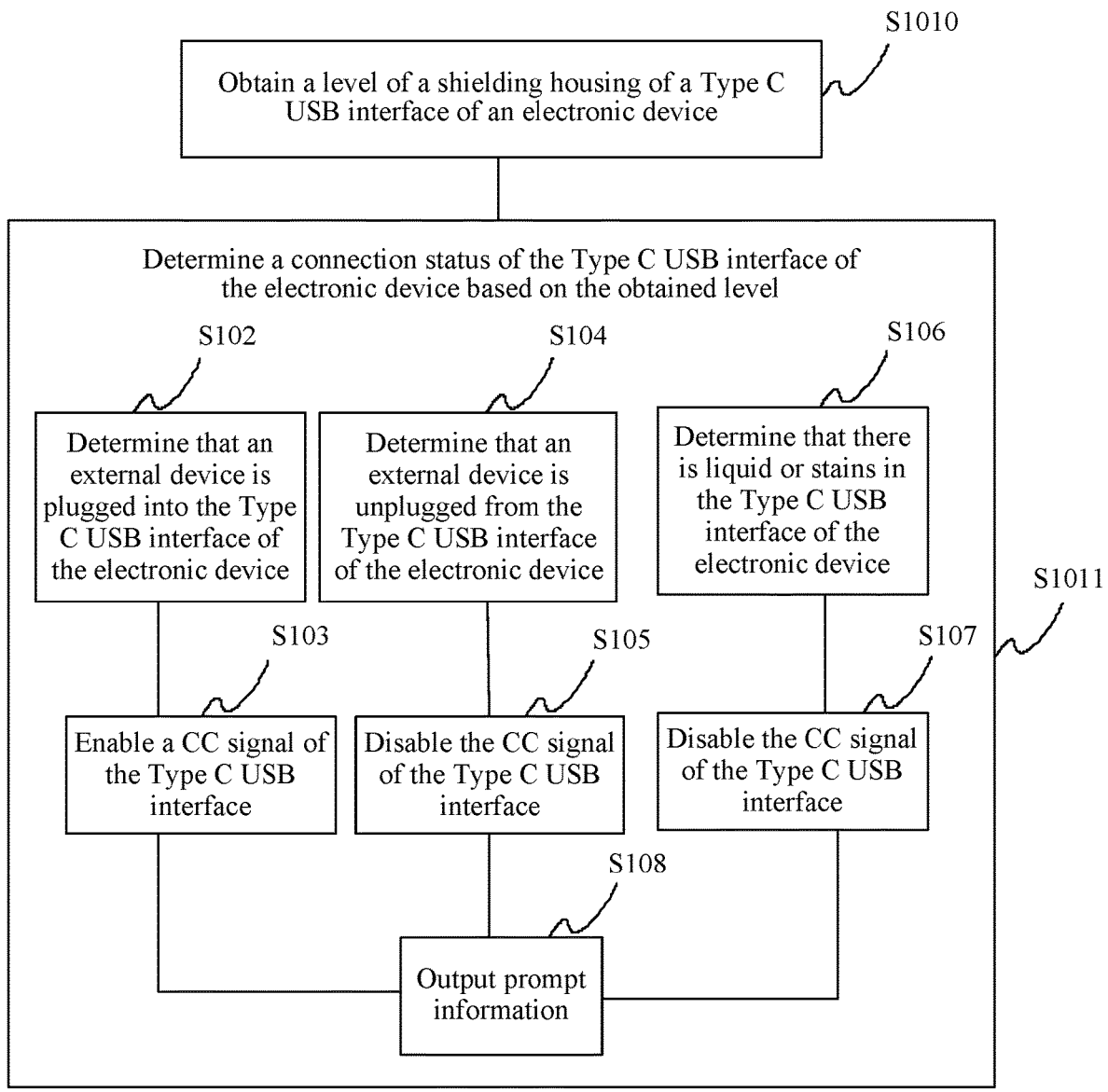
FIG. 8 is a flowchart of a method for controlling a Type C USB interface according to an embodiment of this application.

FIG. 8 is a flowchart of a method for controlling a Type C USB interface according to an embodiment of this application.

The embodiments of this application further provide an interface obtaining method, applied to the electronic device provided in the embodiments of this application. The method includes the following steps.

S1010: Obtain a voltage level of a shielding housing of the Type C USB interface of an electronic device.

The voltage level may be obtained in a plurality of manners. For example, an ADC module is connected to the shielding housing, to obtain the voltage level. A specific obtaining manner is not limited in this embodiment.

When an external device is plugged into the Type C USB interface of the electronic device, the obtained voltage level is less than a first voltage threshold;

when the external device is unplugged from the Type C USB interface of the electronic device, the obtained voltage level is greater than a second voltage threshold and less than a third voltage threshold; or when there is liquid or stains in the Type C USB interface of the electronic device, the obtained voltage level is greater than the first voltage threshold and less than the second voltage threshold.

S1011: Determine a connection status of the Type C USB interface of the electronic device based on the obtained voltage level.

Step S1011 specifically includes S102, S103, and S108; or S104, S105, and S108; or S106, S107, and S108.

S102: Determine that the external device is plugged into the Type C USB interface of the electronic device, where when the obtained voltage level is less than the first voltage threshold, it is determined that the external device is plugged into the Type C USB interface of the electronic device.

S103: Enable a CC signal of the Type C USB interface, to detect a type of the plugged external device.

Specifically, a processor may output the CC signal to the Type C USB interface, or may control a PD module to output the CC signal to the Type C USB interface. For specific implementations, refer to the description of the foregoing embodiments of this application. Details are not described herein again.

S108: Output prompt information. The prompt information is used to inform a user that the external device is plugged into the electronic device, or used to inform the user of a device type of the plugged electronic device. The prompt information may be text, figures, audio, vibration, or the like.

S104: Determine that an external device is unplugged from the Type C USB interface of the electronic device, where when the obtained voltage level is greater than the second voltage threshold and less than the third voltage threshold, it is determined that the external device is unplugged from the Type C USB interface of the electronic device.

S105: Disable the CC signal of the Type C USB interface. Specifically, the processor may stop outputting the CC signal to the Type C USB interface, or may control the PD module to stop outputting the CC signal to the Type C USB interface. For specific implementations, refer to the description of the foregoing embodiments of this application. Details are not described herein again.

S108: Output prompt information. The prompt information is used to inform the user that the external device is unplugged from the electronic device. The prompt information may be text, figures, audio, vibration, or the like.

S106: Determine that there is liquid or stains in the Type C USB interface of the electronic device, where when the obtained voltage level is greater than the first voltage threshold and less than the second voltage threshold, it is determined that there is liquid or stains in the Type C USB interface of the electronic device.

Further, a type of the liquid or the stains may further be determined based on a range that is between the first voltage threshold and the second voltage threshold and in which the obtained voltage level falls.

S107: Disable the CC signal of the Type C USB interface, where when it is determined that there is liquid or stains in the Type C USB interface of the electronic device, the CC signal of the Type C USB interface is disabled, to reduce corrosion on the interface caused by the liquid or the stains.

S108: Output prompt information. The prompt information is used to inform the user that there is liquid or stains in the Type C USB interface, to inform the user to clean the interface in a timely manner. A type of the prompt information used to inform the user that there is liquid or stains is optional. The prompt information may be text, figures, audio, vibration, or the like.

In the embodiments of this application, the voltage level of the shielding housing of the Type C USB interface of the electronic device is obtained; whether the external device is plugged into or unplugged from the Type C USB interface and whether there is liquid or stains in the Type C USB interface are determined based on the obtained voltage level; when it is determined that the external device is plugged into the Type C USB interface of the electronic device, the CC signal of the Type C USB interface is enabled; and when it is determined that the external device is unplugged from the Type C USB interface of the electronic device or that there is liquid or stains in the Type C USB interface of the electronic device, the CC signal of the Type C USB interface is disabled. Therefore, problems of terminal power waste and security risks (such as short circuit and corrosion caused by the liquid in the interface) caused by real-time charging of the CC pin of the Type C USB interface are effectively alleviated.

It can be understood that, to implement the foregoing functions, the terminal includes corresponding hardware structures and/or software modules for performing the functions. A person of ordinary skill in the art should easily be aware that, in combination with units and algorithms steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, functional unit division may be performed for the terminal according to the foregoing method examples. For example, the functional unit division may be performed corresponding to the functions, or two or more functions may be integrated in one processing module. The integrated unit may be implemented in a form of hardware, or may be implemented in a form of a software functional unit. It should be noted that, in the embodiments of this application, unit division is exemplary, and is merely a logical function division. In an actual implementation, another division manner may be used.

Figure 9:
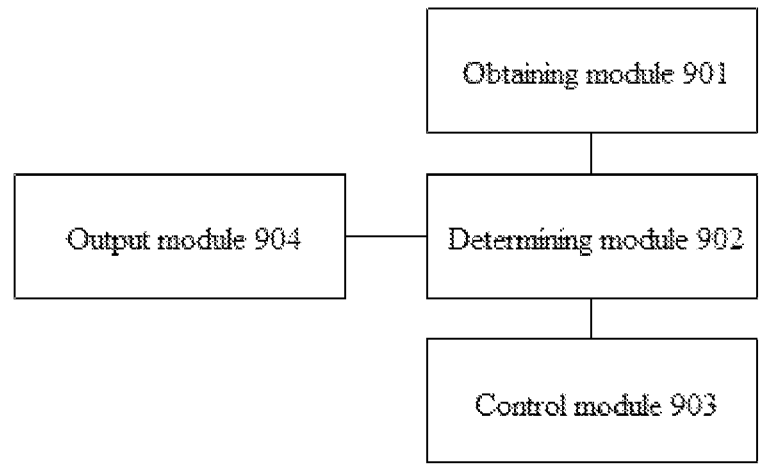
FIG. 9 is a schematic structural diagram of an electronic device according to an embodiment of the present invention.

FIG. 9 is a schematic structural diagram of an electronic device according to an embodiment of the present invention.

As shown in FIG. 9, the electronic device specifically includes the following units:

an obtaining module 901, configured to obtain a voltage level of a shielding housing of a Type C USB interface of the electronic device;

a determining module 902, configured to determine, based on the obtained voltage level, whether an external device is plugged into or unplugged from the Type C USB interface of the electronic device and whether there is liquid or stains in the Type C USB interface of the electronic device;

a control module 903, configured to enable a CC signal of the Type C USB interface when it is determined that the external device is plugged into the Type C USB interface of the electronic device; and is further configured to disable the CC signal of the Type C USB interface when it is determined that the external device is unplugged from the Type C USB interface of the electronic device or that there is liquid or stains in the Type C USB interface of the electronic device; and an output module 904, configured to output prompt information when it is determined that the external device is plugged into the Type C USB interface of the electronic device, where the prompt information is used to inform the user that the external device is plugged into the electronic device, or used to inform the user of a device type of the plugged electronic device; and the prompt information may be text, figures, audio, vibration, or the like.

The output module is further configured to output prompt information when it is determined that the external device is unplugged from the Type C USB interface of the electronic device. The prompt information is used to inform the user that the external device is unplugged from the electronic device. The prompt information may be text, figures, audio, vibration, or the like.

The output module is further configured to output prompt information when it is determined that there is liquid or stains in the Type C USB interface of the electronic device. The prompt information is used to inform the user that there is liquid or stains in the Type C USB interface, to inform the user to clean the interface in a timely manner. A type of the prompt information used to inform the user that there is liquid or stains is optional. The prompt information may be text, figures, audio, vibration, or the like.

For specific implementations of the obtaining module, the determining module, the control module, and the output module in this embodiment, refer to the foregoing description of the embodiments of this application. Repeated descriptions are not provided again.

Figure 10:
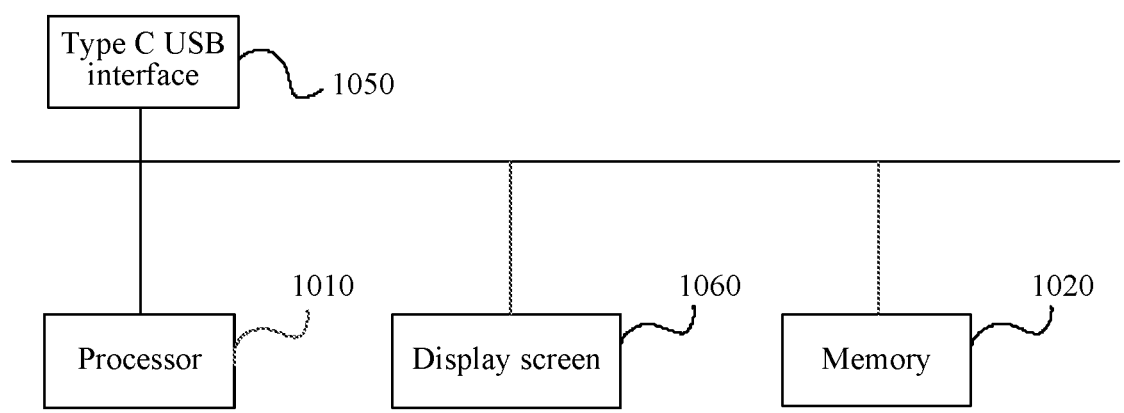
FIG. 10 is a schematic structural diagram of another electronic device according to an embodiment of the present invention.

FIG. 10 is a schematic structural diagram of another electronic device according to an embodiment of the present invention.

As shown in FIG. 10, the device includes a processor 1010, a memory 1020, a Type C USB interface 1050, and a display 1060. The processor 1010, the memory 1020, the Type C USB interface 1050, and the display 1060 are connected to each other by using a bus.

The memory 1020 is configured to store computer executable program code, and the program code includes an instruction. The processor 1010 runs the instruction stored in the memory 1020, to implement various functional applications and data processing of the electronic device. The memory 1020 may mainly include a program storage area and a data storage area. The program storage area may store an operating system, an application program required by at least one function (for example, a prompt information displaying function, a sound playing function, and an image playing function), or the like. The data storage area may store data (for example, audio data and a phone book) created according to use of the electronic device. In addition, the memory 120 may include a high-speed random access memory, and may further include a non-volatile memory such as at least one disk storage device, a flash storage device, or another volatile solid-state storage device.

The processor 1010 is a control center of the electronic device, and is connected to various parts of the entire mobile phone by using various interfaces and lines. By running or executing a software program and/or a module stored in the memory 1020, and invoking data stored in the memory 1020, various functions and data processing of the electronic device are performed, thereby implementing overall monitoring on the electronic device. Optionally, the processor 1010 may include one or more processing units. The processor 1010 may integrate an application processor, a modem processor, a baseband module, a power management chip, a memory, a coder/decoder, and the like. The application processor mainly processes an operating system, a user interface, an application program, and the like. The modem processor mainly processes wireless communication. It may be understood that the modem processor may either not be integrated into the processor 1010. The internet protocol, the wireless local area network protocol (for example, IEEE 702.11), 3G communication protocol, 4G communication protocol, 5G communication protocol, or the like may be implemented by using the processor 1010 and the memory 1020.

The processor 1010 in this embodiment of this application is configured to obtain a voltage level of a shielding housing of a Type C USB interface 1050 of the electronic device; determine, based on the obtained voltage level, whether an external device is plugged into or unplugged from the Type C USB interface of the electronic device and whether there is liquid or stains in the Type C USB interface of the electronic device; and enable the CC signal of the Type C USB interface when it is determined that the external device is plugged into the Type C USB interface of the electronic device; and is further configured to disable the CC signal of the Type C USB interface when it is determined that the external device is unplugged from the Type C USB interface of the electronic device or that there is liquid or stains in the Type C USB interface of the electronic device.

The processor is further configured to output prompt information when it is determined that the external device is plugged into the Type C USB interface of the electronic device. The prompt information is used to inform a user that the external device is plugged into the electronic device, or used to inform the user of a device type of the plugged electronic device. The prompt information may be text, figures, audio, vibration, or the like.

The processor is further configured to output prompt information when it is determined that the external device is unplugged from the Type C USB interface of the electronic device. The prompt information is used to inform a user that the external device is unplugged from the electronic device. The prompt information may be text, figures, audio, vibration, or the like.

The processor is further configured to output prompt information when it is determined that there is liquid or stains in the Type C USB interface of the electronic device. The prompt information is used to inform the user that there is liquid or stains in the Type C USB interface, to inform the user to clean the interface in a timely manner. A type of the prompt information used to inform the user that there is liquid or stains is optional. The prompt information may be text, figures, audio, vibration, or the like.

The foregoing prompt information may be output by the display screen 1060 of the electronic device, or may be output by an audio device, such as a speaker (not shown).

In the embodiments of this application, the Type C USB interface may be a charging interface or a headset jack.

In the embodiments of this application, the external device connected to the Type C USB interface of the electronic device may be a charger or a headset.

The processor invokes the instruction stored in the memory to implement the solution of this embodiment of this application. Therefore, for a specific implementation, refer to the foregoing embodiments of this application. Repeated descriptions are not provided again.

In the embodiments of this application, the voltage level may represent a power supply, or may represent a voltage level value of a power supply; and R may represent a resistance device in a circuit, or may represent a resistance value of resistance.

A person skilled in the art may be further aware that, in combination with the examples described in the embodiments disclosed in this specification, units and steps may be implemented by electronic hardware, computer software, or a combination thereof. To clearly describe the interchangeability between the hardware and the software, the foregoing description has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the integrated unit is implemented in the form of a software functional unit and sold or used as an independent product, the integrated unit may be stored in a computer-readable storage medium. Based on such an understanding, all or some of the technical solutions of this application may be implemented in a form of a software product. The software product is stored in a storage medium, and includes instructions for instructing a computer device (which may be a personal computer, a server, a network device, or the like) to perform all or some of the steps of the methods described in the embodiments of this application. The foregoing storage medium includes various media that can store program code, such as a flash drive, a removable hard disk, a read-only memory (English: read-only memory, ROM), a random access memory (English: random access memory, RAM), a magnetic disk, or an optical disc.

The foregoing descriptions are merely preferred example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device comprising:
a Type C USB interface having a shielding housing; and
a processor; wherein
the processor is connected to the Type C USB interface;
the Type C USB interface is configured to connect to an external device;
the shielding housing of the Type C USB interface is disconnected from a ground signal of the electronic device;
when no external device is connected to the Type C USB interface, a voltage level of the shielding housing of the Type C USB interface is a first voltage level, wherein the first voltage level is greater than 0;
when the external device is connected to the Type C USB interface, the processor outputs a signal to a CC pin of the Type C USB interface; and
when no external device is connected to the Type C USB interface, the processor stops outputting the signal to the CC pin of the Type C USB interface.

2. The electronic device of claim 1, wherein:
the electronic device further comprises a power delivery (PD) module;
the processor is connected to the Type C USB interface by using the PD module; and the processor is specifically configured to:
when the external device is connected to the Type C USB interface, control the PD module to output the signal to the CC pin of the Type C USB interface; and
when no external device is connected to the Type C USB interface, control the PD module to stop outputting the signal to the CC pin of the Type C USB interface.

3. The electronic device of claim 1, wherein the processor is further configured to perform at least one of:
output first prompt information when the external device is unplugged from the Type C USB interface, wherein the first prompt information is used to inform that the external device is unplugged from the Type C USB interface; or
output second prompt information when the external device is connected to the Type C USB interface, wherein the second prompt information is used to inform that the external device is connected to the Type C USB interface.

4. The electronic device of claim 1, wherein the processor is further configured to:

determine, based on the voltage level of the shielding housing of the Type C USB interface, whether there is liquid or stains in the Type C USB interface; and stop outputting the signal to the CC pin of the Type C USB interface when there is liquid or stains in the Type C USB interface.

5. The electronic device of claim 4, wherein the processor is further configured to output third prompt information, and the third prompt information is used to inform that there is liquid or stains in the Type C USB interface.

6. The electronic device of claim 1, wherein:

the electronic device further comprises a first comparator;

a first positive input end of the first comparator is connected to the shielding housing of the Type C USB interface;

a first negative input end of the first comparator is connected to a first reference voltage;

a first output end of the first comparator is connected to the processor;

the first comparator is configured to compare a voltage level of the first positive input end with a voltage level of the first negative input end and output a first comparison signal to the processor; and the processor is configured to determine, based on the first comparison signal, that the external device is unplugged from the Type C USB interface and/or that the external device is connected to the Type C USB interface.

7. The electronic device of claim 6, wherein:

the electronic device further comprises a second comparator;

a second negative input end of the second comparator is connected to the shielding housing of the Type C USB interface;

a second positive input end of the second comparator is connected to a second reference voltage;

a second output end of the second comparator is connected to the processor;

the second comparator is configured to compare a voltage level of the second positive input end with a voltage level of the second negative input end and output a second comparison signal to the processor; and the processor is configured to determine, based on the first comparison signal and the second comparison signal, that the external device is unplugged from the Type C USB interface, and/or that the external device is connected to the Type C USB interface, and/or that there is liquid or stains in the Type C USB interface.

8. The electronic device of claim 1, wherein:

the processor comprises an analog-to-digital converter (ADC) detection module, and the ADC detection module is connected to the shielding housing of the Type C USB interface;

the ADC detection module is configured to detect the voltage level of the shielding housing of the Type C USB interface; and the processor is configured to determine, based on the voltage level detected by the ADC detection module, that the external device is unplugged from the Type C USB interface, and/or that the external device is connected to the Type C USB interface, and/or there is liquid in the Type C USB interface.

9. A method for controlling a Type C USB interface, applied to an electronic device comprising a Type C USB interface having a shielding housing; and a processor, wherein the processor is connected to the Type C USB interface; the Type C USB interface is configured to connect to an external device; the shielding housing of the Type C USB interface is disconnected from a ground signal of the electronic device; when no external device is connected to the Type C USB interface, a voltage level of the shielding housing of the Type C USB interface is a first voltage level, wherein the first voltage level is greater than 0; when the external device is connected to the Type C USB interface, the processor outputs a signal to a CC pin of the Type C USB interface; and when no external device is connected to the Type C USB interface, the processor stops outputting the signal to the CC pin of the Type C USB interface, wherein the method comprises:

obtaining the voltage level of the shielding housing of the Type C USB interface;

determining, based on the voltage level of the shielding housing of the Type C USB interface, that there is no external device connected to the Type C USB interface, the external device is connected to the Type C USB interface, or that the external device is unplugged from the Type C USB interface; and in response to a determination that no external device is connected to the Type C USB interface, or in response to a determination that the external device is unplugged from the Type C USB interface, stopping outputting a signal to a CC pin of the Type C USB interface.

10. The method of claim 9, wherein the method further comprises:

in response to the determination that the external device is connected to the Type C USB interface, outputting the signal to the CC pin of the Type C USB interface.

11. The method of claim 9, wherein the method further comprises:

in response to the determination that the external device is unplugged from the Type C USB interface, outputting first prompt information to inform that the external device is unplugged from the Type C USB interface; and in response to the determination that the external device is connected to the Type C USB interface, outputting second prompt information to inform that the external device is connected to the Type C USB interface.

12. The method of claim 9, wherein the method further comprises: determining, based on the voltage level of the shielding housing of the Type C USB interface, that there is liquid or stains in the Type C USB interface.

13. The method of claim 12, wherein the method further comprises:

in response to the determination that there is liquid or stains in the Type C USB interface, stopping outputting the signal to the CC pin of the Type C USB interface.

14. The method of claim 12, wherein the method further comprises outputting third prompt information in response to the determination that there is liquid or stains in the Type C USB interface.

15. A non-transitory computer readable storage medium for storing one or more programs, wherein the one or more programs comprise an instruction, and when the instruction is executed by an electronic device having a Type C USB interface, the instruction enables the electronic device to execute the following operations:

obtaining a voltage level of a shielding housing of the Type C USB interface;

determining, based on the voltage level of the shielding housing of the Type C USB interface, that there is no external device connected to the Type C USB interface, the external device is connected to the Type C USB interface, or that the external device is unplugged from the Type C USB interface; and in response to the determination that no external device is connected to the Type C USB interface, or in response to a determination that the external device is unplugged from the Type C USB interface, stopping outputting a signal to a CC pin of the Type C USB interface.

16. The non-transitory computer readable storage medium of claim 15, wherein the instruction further enables the electronic device to execute the following operations:

in response to the determination that the external device is connected to the Type C USB interface, outputting the signal to the CC pin of the Type C USB interface.

17. The non-transitory computer readable storage medium of claim 15, wherein the instruction further enables the electronic device to execute the following operations:

in response to the determination that the external device is unplugged from the Type C USB interface, outputting first prompt information to inform that the external device is unplugged from the Type C USB interface; and in response to the determination that the external device is connected to the Type C USB interface, outputting second prompt information to inform that the external device is connected to the Type C USB interface.

18. The non-transitory computer readable storage medium of claim 15, wherein the instruction further enables the electronic device to execute the following operations:

determining, based on the voltage level of the shielding housing of the Type C USB interface, that there is liquid or stains in the Type C USB interface.

19. The non-transitory computer readable storage medium of claim 15, wherein the instruction further enables the electronic device to execute the following operations:

in response to the determination that there is liquid or stains in the Type C USB interface, stopping outputting the signal to the CC pin of the Type C USB interface.

20. The non-transitory computer readable storage medium of claim 18, wherein the instruction further enables the electronic device to execute the following operations:

outputting third prompt information in response to the determination there is liquid or stains in the Type C USB interface.

* * * * *